(12) United States Patent
Gould et al.

(10) Patent No.: US 9,067,236 B2
(45) Date of Patent: Jun. 30, 2015

(54) TWO-COMPONENT LIQUID DISPENSER GUN AND SYSTEM

(75) Inventors: Mark A. Gould, Gainesville, GA (US); Leslie J. Varga, Cumming, GA (US)

(73) Assignee: NORDSON CORPORATION, Westlake, OH (US)

(*) Notice: Subject to any disclaimer, the term of this patent is extended or adjusted under 35 U.S.C. 154(b) by 450 days.

(21) Appl. No.: 13/384,785

(22) PCT Filed: Oct. 4, 2010

(86) PCT No.: PCT/US2010/051293
§ 371 (c)(1),
(2), (4) Date: Jan. 19, 2012

(87) PCT Pub. No.: WO2011/044029
PCT Pub. Date: Apr. 14, 2011

(65) Prior Publication Data
US 2012/0187145 A1 Jul. 26, 2012

Related U.S. Application Data

(60) Provisional application No. 61/248,612, filed on Oct. 5, 2009.

(51) Int. Cl.
*B65D 83/00* (2006.01)
*B05C 11/10* (2006.01)
(Continued)

(52) U.S. Cl.
CPC .............. *B05C 11/10* (2013.01); *B01F 5/0615* (2013.01); *B01F 5/0647* (2013.01);
(Continued)

(58) Field of Classification Search
CPC ... B01F 5/0647; B01F 5/0615; B05C 5/0216; B05C 5/0279; B29B 7/325

USPC .................... 222/145.2, 145.5, 145.6, 148, 1
See application file for complete search history.

(56) References Cited

U.S. PATENT DOCUMENTS 4,202,497 A 5/1980 Ten Pas
4,265,858 A 5/1981 Crum et al.
(Continued)

FOREIGN PATENT DOCUMENTS

CN 1292733 A 4/2001
CN 2846479 Y 12/2006
(Continued)

OTHER PUBLICATIONS

The State Intellectual Property Office of the People's Republic of China, Notification of the First Office Action in CN Application No. 201080044668.6, Jun. 5, 2014.
(Continued)

*Primary Examiner* — J. Casimer Jacyna
(74) *Attorney, Agent, or Firm* — Wood, Herron & Evans, L.L.P.

(57) ABSTRACT

A liquid dispenser gun (14) for mixing first and second liquid components of a two-component mixture (11) and dispensing the two-component mixture (11) includes a gun body (78), a mixing manifold (82), and a nozzle plate (84). The gun body (78) includes a gun body fluid passage (94) in fluid communication with gun body inlets (38, 50, 56) and the mixing manifold (82). The gun body fluid passage (94) is a groove in a bottom surface (79) of the gun body (78) having a generally non-linear shape such that the second component has a generally laminar flow through the gun body fluid passage (94) while a flushing component may be introduced in the gun body fluid passage (94) in a manner to produce turbulence in the flushing component.

29 Claims, 10 Drawing Sheets

(51) Int. Cl.
*B01F 5/06* (2006.01)
*B05C 5/02* (2006.01)
*B29B 7/32* (2006.01)

(52) U.S. Cl.
CPC ............ *B05C 5/0216* (2013.01); *B05C 5/0279* (2013.01); *B05C 11/1026* (2013.01); *B05C 11/1034* (2013.01); *B05C 11/1036* (2013.01); *B05C 11/1044* (2013.01); *B29B 7/325* (2013.01)

(56) References Cited

U.S. PATENT DOCUMENTS

| | | | |
|---|---|---|---|
| 5,922,002 | A | 7/1999 | Yoon |
| 6,105,880 | A | 8/2000 | Bazil et al. |
| 6,220,843 | B1 | 4/2001 | Allen |
| 6,315,161 | B1 * | 11/2001 | Bezaire et al. .................... 222/1 |
| 7,161,082 | B2 | 1/2007 | Matsushita et al. |
| 8,241,410 | B1 * | 8/2012 | Pease et al. .................... 96/275 |
| 2001/0002437 | A1 | 5/2001 | Pagedas |
| 2004/0242960 | A1 | 12/2004 | Orban, III |
| 2005/0033243 | A1 | 2/2005 | Jespersen |
| 2005/0268845 | A1 | 12/2005 | Ganzer et al. |
| 2008/0192077 | A1 | 8/2008 | Middleton et al. |
| 2008/0230003 | A1 | 9/2008 | Le Strat et al. |
| 2009/0314343 | A1 | 12/2009 | Okaniwa et al. |
| 2010/0326522 | A1 | 12/2010 | Okaniwa |

FOREIGN PATENT DOCUMENTS

| | | |
|---|---|---|
| CN | 101309755 A | 11/2008 |
| JP | 1179772 | 12/1989 |
| JP | 2002505951 A | 2/2002 |
| JP | 2008311604 A | 12/2008 |
| WO | 9946057 A1 | 9/1999 |
| WO | 2008105411 A1 | 9/2008 |
| WO | 2009005083 A1 | 1/2009 |

OTHER PUBLICATIONS

U.S. Patent and Trademark Office, International Search Report and Written Opinion in PCT Application Serial No. PCT/US2010/051293, Nov. 26, 2010.
U.S. Patent and Trademark Office, International Preliminary Report on Patentability in PCT Application Serial No. PCT/US2010/051293, Nov. 14, 2011.
Japanese Patent Office, Notification of Reason for Refusal in JP Application No. 2012-533231, Sep. 25, 2014.
The State Intellectual Property Office of the People's Republic of China, Notification of the Second Office Action in CN Application No. 201080044668.6, Feb. 2, 2015 (8 pages).

* cited by examiner

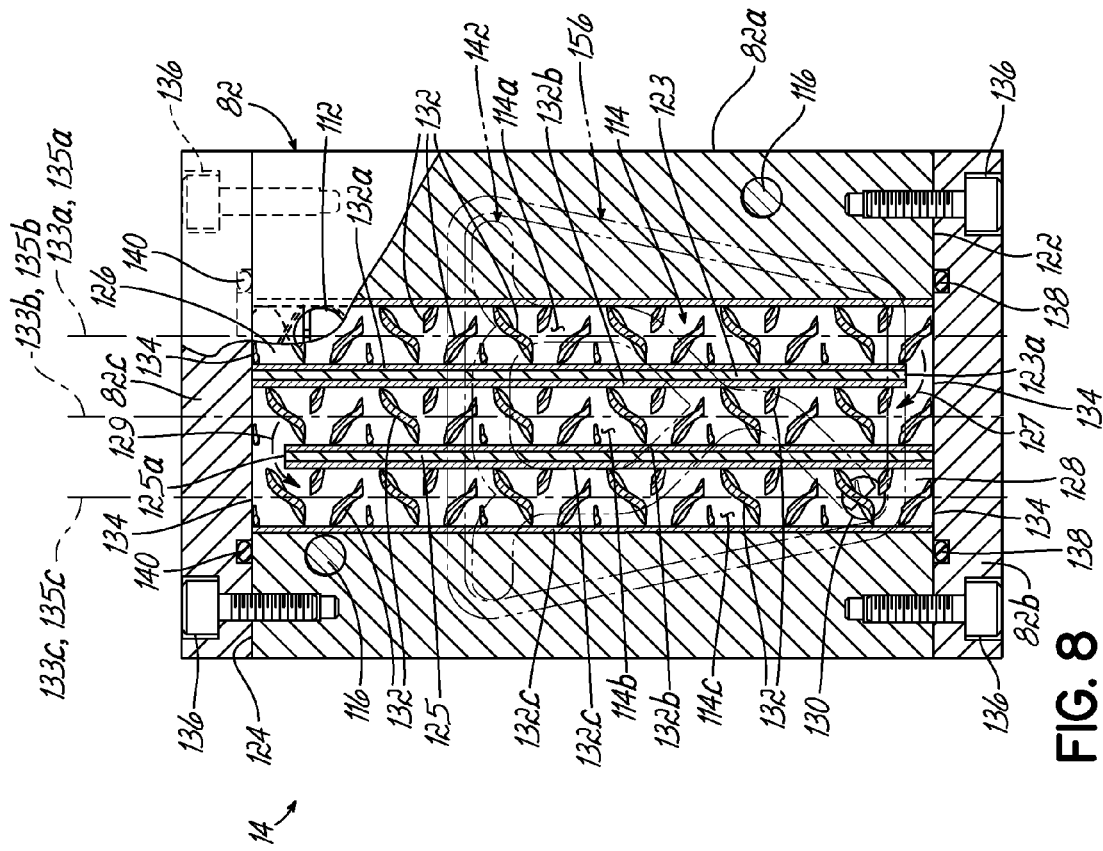
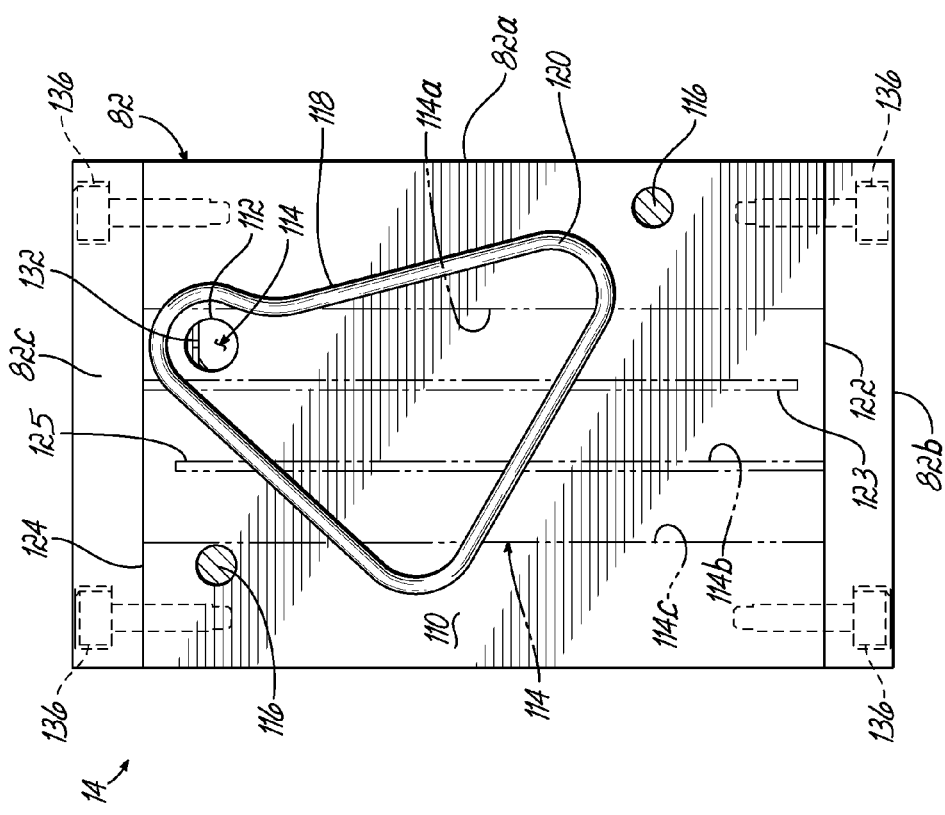
FIG. 8
FIG. 7

TWO-COMPONENT LIQUID DISPENSER GUN AND SYSTEM

CROSS-REFERENCE TO RELATED APPLICATION

This application claims the priority of U.S. Provisional Patent Application Ser. No. 61/248,612, filed on Oct. 5, 2009, the disclosure of which is incorporated by reference herein.

FIELD OF THE INVENTION

This invention generally relates to liquid dispenser systems used for a variety of purposes, and particularly to a liquid dispenser gun and system configured to mix and dispense viscous liquids such as two-component encapsulation material for solar panels.

BACKGROUND OF THE INVENTION

Solar panels are conventionally formed from an upper layer of glass, an intermediate layer including the solar cell or plurality of solar cells (hereinafter "solar cell"), and a lower layer made of glass or a compound foil. The solar cell is wrapped in an encapsulation material. The encapsulation of the solar cell protects the solar cell from damage and ensures that the upper and lower layers of the solar panel remain adhesively coupled to the solar cell, thereby forming a solar cell "sandwich." Solar panel manufacturers have conventionally used foil sheets of polyvinyl butyral (PVB) or ethylene-vinyl acetate (EVA) as the encapsulation material. The EVA or PVB foil sheets must be carefully positioned around the solar cell and then melted in a laminator and cooled to create the solar panel "sandwich." This encapsulation process is highly time-consuming for the lamination and the placement of the foil sheets. The encapsulation process also consumes a significant amount of energy to melt the foils.

To address the shortcomings of the traditional foil sheet encapsulation process, solar panel manufacturers have begun to replace the encapsulating foil sheets with a liquid encapsulation material. The liquid encapsulation material is generally formed from a base component and a catalyst component, the combination protecting and adhering to the solar cell. In one exemplary process, the liquid encapsulation material may include a first optically clear material for the front side of the solar cell and a second material including quartz powder for improved conductivity and thermal properties for the rear side of the solar cell. The liquid encapsulation material must be metered and dispensed accurately on the solar cell such that a continuous generally planar layer of liquid encapsulation material is provided over the entire surface area of the solar cell.

Conventional liquid dispenser systems have been largely unsuccessful at providing consistent flow stream quality for the liquid encapsulation material across the width of a solar panel, especially for solar panels of varying size and shape. For example, in liquid dispenser systems with a single elongate dispenser outlet, the accuracy and consistency of the liquid flow across the width of the solar panel changes undesirably as the size of the solar panel changes. In liquid dispenser systems with a plurality of parallel liquid outlets, the variance in flow stream quality across the width of the dispenser may cause separate streams of liquid encapsulation material to flow together and adversely affect the formation of a continuous encapsulation layer on the solar cell. If the dimensions of a solar cell to be encapsulated change from one solar panel to the next solar panel, conventional liquid dispenser systems must be completely reconfigured before dispensing can continue, leading to high amounts of manufacturing downtime.

Additionally, the entire liquid dispenser system must typically be flushed of the liquid encapsulation material between each reconfiguration or every few minutes to avoid setting of the liquid encapsulation material within the dispenser system. However, conventional liquid dispenser systems capture a high amount or volume of encapsulation material between the valves associated with the dispenser and the liquid outlets of the dispenser. This high amount of encapsulation material is completely wasted every time the dispenser system is flushed, and further leads to undesirable dripping of encapsulation material from the liquid outlets between dispensing cycles.

Furthermore, conventional liquid dispenser systems typically meter the flow of each component of the liquid encapsulation material with only gear pumps. For the components of the liquid encapsulation material including abrasive material such as quartz powder, the gear pumps are subject to a high rate of wear and failure. Thus, it would be desirable to provide a liquid dispenser gun and system that address these and other problems with the encapsulation process for a solar panel.

SUMMARY OF THE INVENTION

According to one embodiment of the invention, a liquid dispenser gun is adapted to mix first and second liquid components of a two-component mixture and dispense the two-component mixture on a substrate. The liquid dispenser gun includes a gun body with a first gun body inlet adapted to receive the first component, a second gun body inlet adapted to receive the second component, and a third gun body inlet adapted to receive a liquid flushing component. The gun body also includes a gun body fluid passage in fluid communication with the first, second, and third gun body inlets. The gun body fluid passage is a non-linear passage including a downstream segment such that the second component is introduced with a laminar flow through the gun body fluid passage and the flushing component is introduced upstream of the second component and at an angle to the laminar flow of the second component to thereby produce turbulence in the flushing component as the flushing component flows toward the downstream segment. The liquid dispenser gun also includes a mixing manifold coupled to the gun body. The mixing manifold includes a mixer passage in fluid communication with the gun body fluid passage and a plurality of mixing elements disposed in the mixer passage. The liquid dispenser gun further includes a nozzle plate coupled to the mixing manifold. The nozzle plate includes at least one nozzle with a plurality of liquid outlets. The nozzle plate provides fluid communication between the mixer passage and the at least one nozzle.

In another embodiment, a liquid dispenser system includes the liquid dispenser gun as described above. The liquid dispenser system also includes at least one supply pump for delivering one or more of the liquid flushing component, the first liquid component, and the second liquid component to the gun body. The liquid dispenser system also includes a first flow meter configured to meter the flow of the first component delivered to the gun body. Likewise, the liquid dispenser system also includes a second flow meter configured to meter the flow of the second component delivered to the gun body.

In a further embodiment, a liquid dispenser gun is adapted to mix first and second liquid components of a two-component mixture and dispense the two-component mixture on a substrate. The liquid dispenser gun includes a gun body with a first gun body inlet in fluid communication with a first valve adapted to receive the first component, and a second gun body inlet in fluid communication with a second valve adapted to receive the second component. The gun body also includes a gun body fluid passage in fluid communication with the first and second valves. The liquid dispenser gun also includes a mixing manifold coupled to the bottom surface of the gun body. The mixing manifold includes a mixing manifold main body defining a mixer passage in fluid communication with the gun body fluid passage and extending along a first mixer passage axis that the first and second components travel along in the mixer passage. The mixing manifold also includes at least one cap coupled to a sidewall of the mixer manifold main body, and a first static mixer disposed in the mixer passage and defining a first static mixer axis substantially parallel to the first mixer passage axis. The mixer passage extends to the sidewall of the mixer manifold main body such that the cap may be removed from the mixer manifold main body to provide access for servicing or replacing the first static mixer by moving the first static mixer along the first mixer passage axis and the first static mixer axis. The liquid dispenser gun further includes a nozzle plate coupled to the mixing manifold. The nozzle plate includes at least one nozzle with a plurality of liquid outlets. The nozzle plate provides fluid communication between the mixer passage and the at least one nozzle.

In yet another embodiment, a method of mixing first and second components of a two-component mixture and forming a substantially continuous layer of the two-component mixture on a substrate is provided. The method includes delivering the first component to a downstream segment of a gun body fluid passage and delivering the second component through the gun body fluid passage with a laminar flow toward the downstream segment. The method further includes mixing the first component and the second component with a plurality of mixing elements to form the two-component mixture. A plurality of liquid outlets dispenses streams of the two-component mixture onto the substrate. The method also includes delivering a flushing component through the gun body fluid passage in a manner that produces turbulence in the flushing component to clean out the first component, the second component, and the two-component mixture.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 7 is a top view in cross-section of the dispenser gun taken along line 7-7 of FIG. 4;

FIG. 8 is a top view in cross-section of the dispenser gun taken along line 8-8 of FIG. 4;

DETAILED DESCRIPTION

Figure 1:
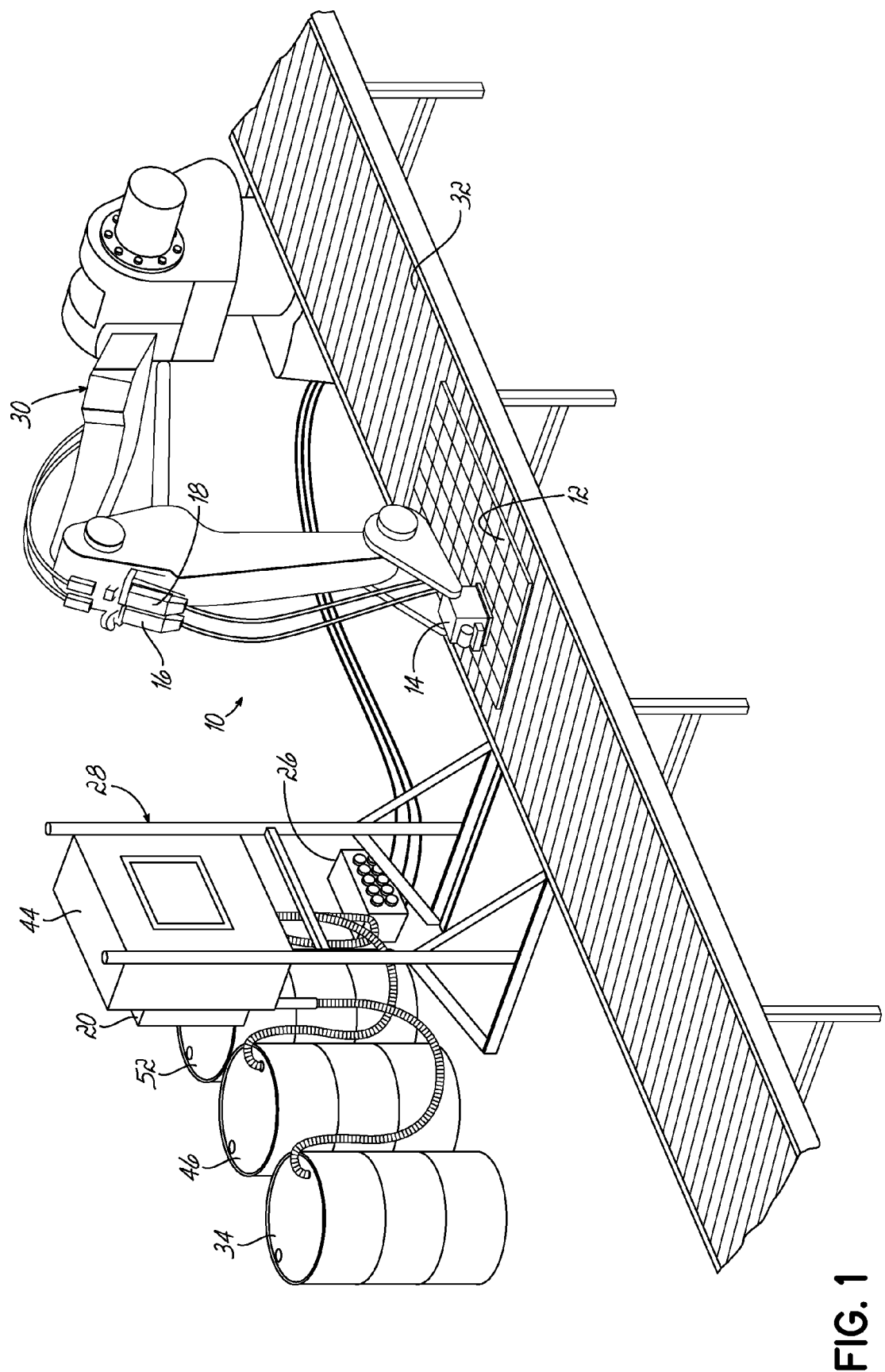
FIG. 1 is a perspective view of one embodiment of a liquid dispenser system of the invention.
Figure 1A:
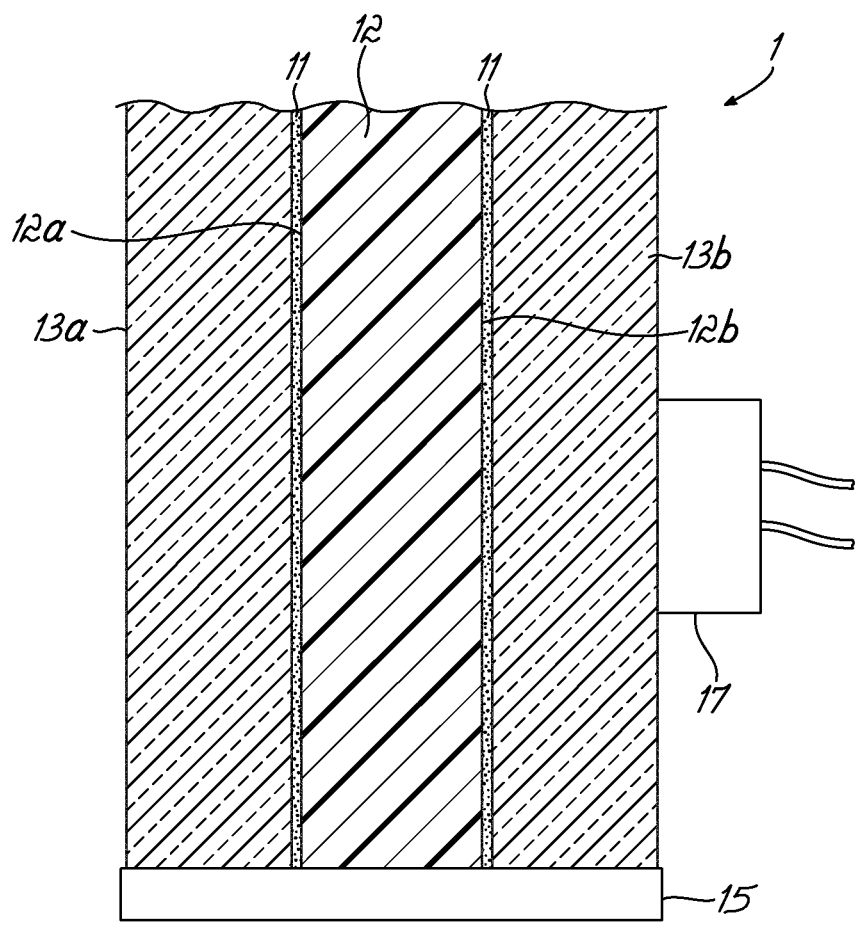
FIG. 1A is a cross-sectional side view of a portion of a solar panel manufactured using the liquid dispenser system of the invention.
Figure 2:
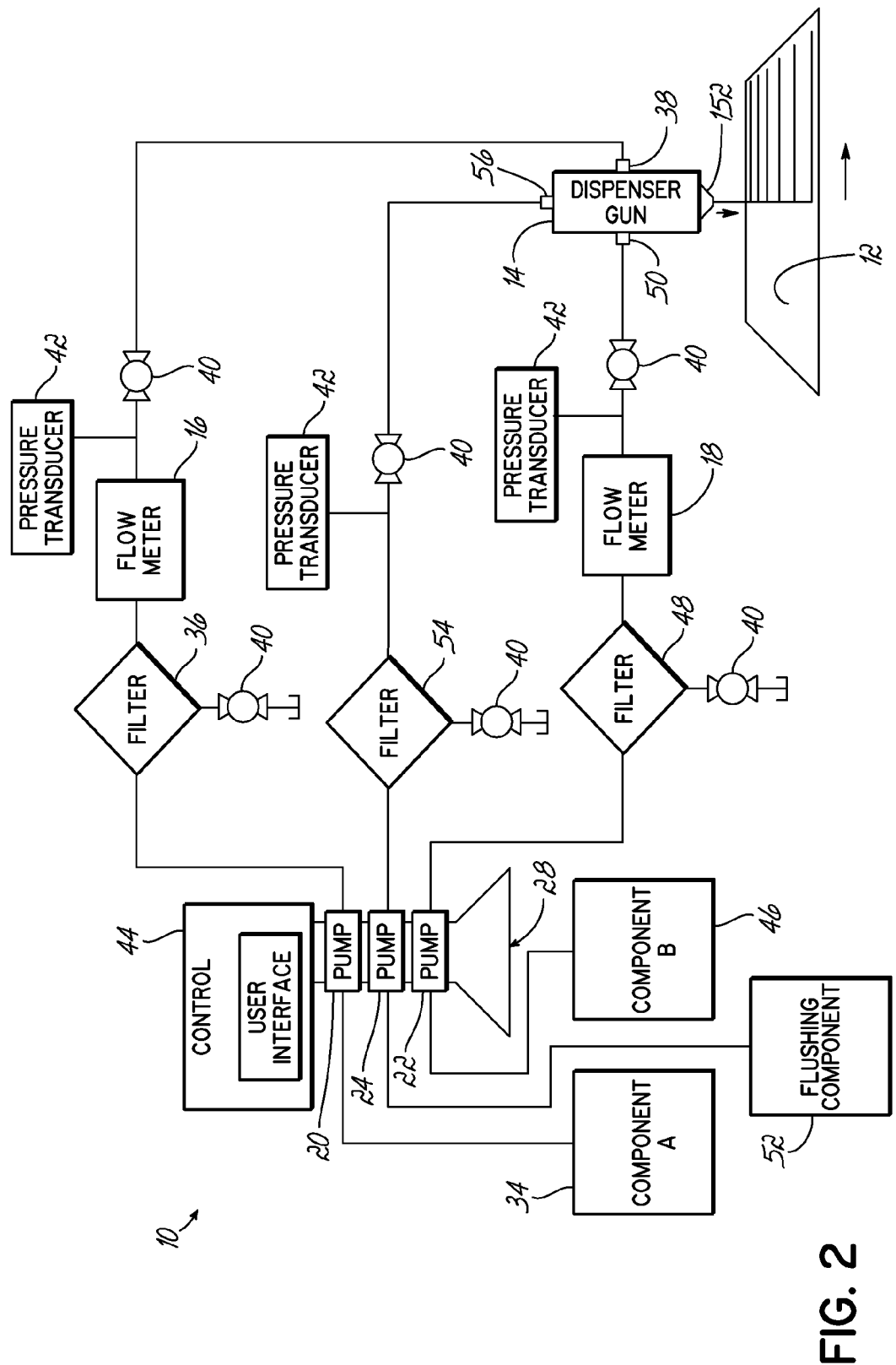
FIG. 2 is a schematic view of the elements of the liquid dispenser system of FIG. 1.

FIGS. 1 and 2 illustrate an exemplary embodiment of a liquid dispenser system 10 for dispensing a two-component mixture onto a substrate 12. For example, the two-component mixture may be a liquid encapsulation material 11 including a first or base liquid component (hereafter referred to as "component A") and a second or catalyst liquid component (hereafter referred to as "component B"), the liquid encapsulation material 11 being dispensed on a solar cell substrate 12 (which may include a plurality of solar cells wired together as well understood in the art) in the manufacturing of a solar panel 1. To this end and as shown in FIG. 1A, the two-component mixture 11 may be applied to a front side 12a of a solar cell substrate 12 to adhesively couple a front covering panel 13a to the solar cell substrate 12, and then the two-component mixture 11 may be applied to a rear side 12b of a solar cell substrate 12 to adhesively couple a rear covering panel 13b to the solar cell substrate 12, thereby sealing the solar cell substrate 12 within the front and rear covering panels to form a solar cell "sandwich" of the solar panel 1. It will be understood that the two-component mixture 11 may alternatively be applied to the front covering panel 13a or the rear covering panel 13b rather than to the solar cell substrate 12 in alternative solar panel construction processes. Furthermore, the rear covering panel 13b may be formed from glass or a non-glass or non-rigid material such as a foil backsheet, while the front covering panel 13a is typically formed from glass or another substantially transparent material. After the solar cell "sandwich" has been formed, the "sandwich" is cured in a laminator. Following the curing process, the side edges of the solar cell sandwich are trimmed at an edge trimmer and framed by a frame member 15. A junction box 17 is then installed along the rear glass panel 13b to control the operation of the solar panel 1 and deliver energy from the solar panel 1 to a power grid or other device, as well understood. With the junction box 17 installed, the solar panel 1 is completely assembled and ready for installation and use.

The liquid dispenser system 10 includes a liquid dispenser gun 14, a first flow meter 16, a second flow meter 18, and three supply pumps 20, 22, 24 configured to deliver component A, component B, and a flushing component (respectively) to the first and second flow meters 16, 18 and the liquid dispenser gun 14. The supply pumps 20, 22, 24 and a pressurized air supply manifold 26 are mounted on a control stand 28 as shown in FIG. 1. The first and second flow meters 16, 18 and the liquid dispenser gun 14 are mounted on a robotic arm 30 configured to move the liquid dispenser gun 14 with respect to the substrate 12. Alternatively, robotic arm 30 may be a stationary support that positions the liquid dispenser gun 14 over the substrate 12 as the substrate 12 is driven by a conveyor belt 32. The first and second flow meters 16, 18 control the flow of (i.e., meter) the supply of component A and component B to the liquid dispenser gun 14, which is operative to dispense a continuous layer of the two-component mixture onto the substrate 12, as described in further detail below. It will be appreciated that the mounting arrangement and layout of the various elements of the liquid dispenser system 10 may be modified in other embodiments without departing from the scope of this invention.

As shown schematically in FIG. 2, component A is supplied to the first supply pump 20 from a first barrel 34. Component A is pumped through a first filter 36 configured to remove undesirable particulate matter from component A. Component A then flows into the first flow meter 16, which controls the amount of flow of component A to the dispenser gun 14. The metered supply of component A exits the first flow meter 16 and is delivered to a first gun body inlet 38 of the dispenser gun 14. A plurality of valves 40 and a pressure transducer 42 are provided in the flow path of component A such that the flow of component A may be monitored by a control 44 provided on the control stand 28. It will be understood that the valves 40 may includes two-way valves, check valves, or other types of known valves.

In a similar manner, component B is supplied to the second supply pump 22 from a second barrel 46. Component B is pumped through a second filter 48 configured to remove undesirable particulate matter from component B. Component B then flows into the second flow meter 18, which controls the amount of flow of component B to the dispenser gun 14. The metered supply of component B exits the second flow meter 18 and is delivered to a second gun body inlet 50 of the dispenser gun 14. Additionally, a plurality of valves 40 and a pressure transducer 42 are provided in the flow path of component B and may be monitored by the control 44.

The liquid flushing component is supplied to the third supply pump 24 from a third barrel 52. The flushing component is pumped through a third filter 54 configured to remove undesirable particulate matter from the flushing component. The flushing component is then delivered directly to a third gun body inlet 56 of the dispenser gun 14. Again, a plurality of valves 40 and a pressure transducer 42 are provided in the flow path of the flushing component and may be monitored by the control 44. It will be appreciated that more or fewer valves 40 and pressure transducers 42 may be included with alternative embodiments of the dispenser system 10.

The first flow meter 16 and the second flow meter 18 may be any kind of flow metering device operative to control the flow rates of component A and component B and thereby control the mixing ratio of the two-component mixture. For example, one or both of the flow meters 16, 18 may include a gear pump. Alternatively, one or both of the flow meters 16, 18 may include a rotary piston pump such as the rotary piston pump disclosed in International Application Publication No. WO2006/050233, the disclosure of which is hereby incorporated by reference in its entirety. Each of these types of flow metering devices may be used for both components of the optically-clear front-side encapsulation material for a solar cell substrate 12. However, the abrasive quartz powder incorporated into one or both of the components of the rear-side encapsulation material for the solar cell substrate 12 quickly wears out gear pumps and rotary piston pumps. Consequently, one or both of the flow meters 16, 18 for a rear-side encapsulation process may include a flow shot meter such as the continuous flow shot meter disclosed in U.S. Patent Application Publication No. 2010/0065585, the disclosure of which is hereby incorporated by reference in its entirety. It will be understood that one or both of the flow meters 16, 18 may include a flow shot meter for any application of the liquid dispenser system 10, including dispensing the front-side encapsulation material for the solar cell substrate 12.

Figure 3:
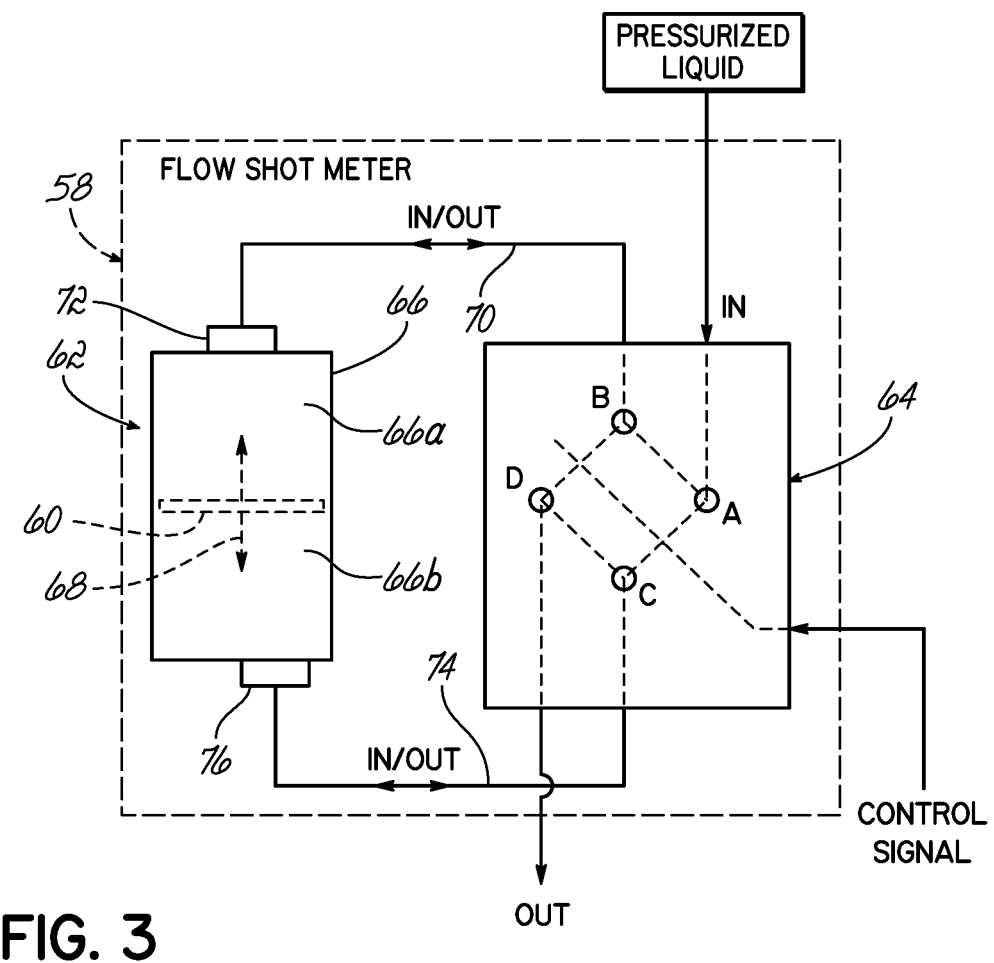
FIG. 3 is a schematic view of the operation of the flow shot meter of the liquid dispenser system.

An exemplary embodiment of a flow shot meter 58 is illustrated schematically at FIG. 3. The flow shot meter 58 is a continuous flow shot meter configured to meter liquid (including highly abrasive or viscous liquid) as a driving piston 60 translates in both directions within a pumping portion 62 of the flow shot meter 58. The flow shot meter 58 includes the pumping portion 62 and a control portion 64. The pumping portion 62 includes a metering chamber 66 in which the driving piston 60 reciprocates as indicated by arrow 68. The driving piston 60 divides the metering chamber 66 into an upper chamber portion 66a and a lower chamber portion 66b. The upper chamber portion 66a is connected to a first flow conduit 70 at an upper orifice 72. The lower chamber portion 66b is connected to a second flow conduit 74 at a lower orifice 76. The upper and lower orifices 72, 76 cyclically act as liquid inlets and liquid outlets for the metering chamber 66 depending on the direction of movement of the driving piston 60. The driving piston 60 is actuated mechanically in the illustrated embodiment, but pneumatic or electronic actuation of the driving piston 60 may also be used in other embodiments.

The first flow conduit 70 delivers liquid to and from point B in the control portion 64, while the second flow conduit 74 delivers liquid to and from point C in the control portion 64. Pressurized liquid from one of the supply pumps 20, 22, 24 is provided to point A in the control portion 64, and delivered to the dispenser gun 14 through point D in the control portion 64. The control portion 64 of the flow shot meter 58 operates as follows. When the driving piston 60 is translating towards the upper chamber portion 66a, the first flow conduit 70 is delivering liquid to point B, which is operatively coupled to point D to allow that liquid to exit the flow shot meter 58. At the same time, point A is operatively coupled to point C to allow liquid entering the flow shot meter 58 to flow through the second flow conduit 74 to fill the lower chamber portion 66b. As the driving piston 60 begins translating back towards the lower chamber portion 66b, the second flow conduit 74 delivers liquid to point C, which is now operatively coupled to point D to allow that liquid to exit the flow shot meter 58. At the same time, point A is operatively coupled to point B to allow liquid entering the flow shot meter 58 to flow through the first flow conduit 70 to fill the upper chamber portion 66a. The alternating operative couplings of points B and C to points A and D may be accomplished using a pneumatically-actuated spool valve (not shown) coupled to the control portion 64, or an electrically-actuated or mechanically-actuated spool valve in other embodiments. Consequently, the flow shot meter 58 continuously delivers a metered supply of liquid to the dispenser gun 14 with approximately zero downtime.

Figure 4:
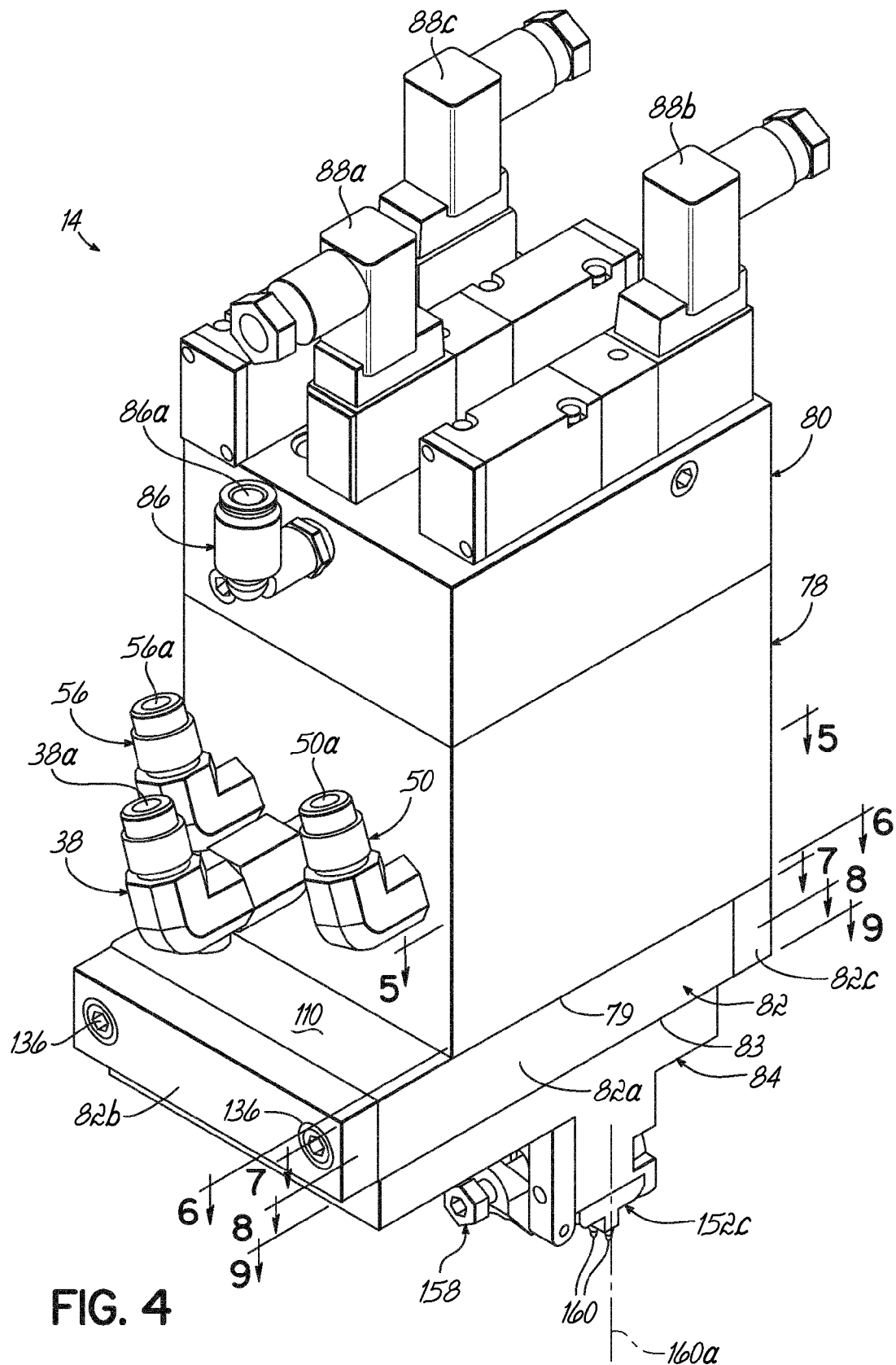
FIG. 4 is a perspective view of the dispenser gun of the liquid dispenser system of FIG. 1.

Turning to the dispenser gun 14, FIGS. 4-10 illustrate additional features of the exemplary embodiment. As shown in FIG. 4, the dispenser gun 14 includes a gun body 78, an air cap 80 coupled to the gun body 78, a mixing manifold 82 coupled to the gun body 78, and a nozzle plate 84 coupled to the mixing manifold 82. The air cap 80 includes an air inlet 86 with an air inlet port 86a configured to receive pressurized air from the pressurized air supply manifold 26. The air cap 80 also includes a first solenoid valve 88a, a second solenoid valve 88b, and a third solenoid valve 88c each operated by the pressurized air delivered through the air inlet port 86a. The solenoid valves 88a, 88b, 88c actuate the valves 92, 104, 108 controlling liquid flow through the dispenser gun 14 as described in further detail below.

Figure 5:
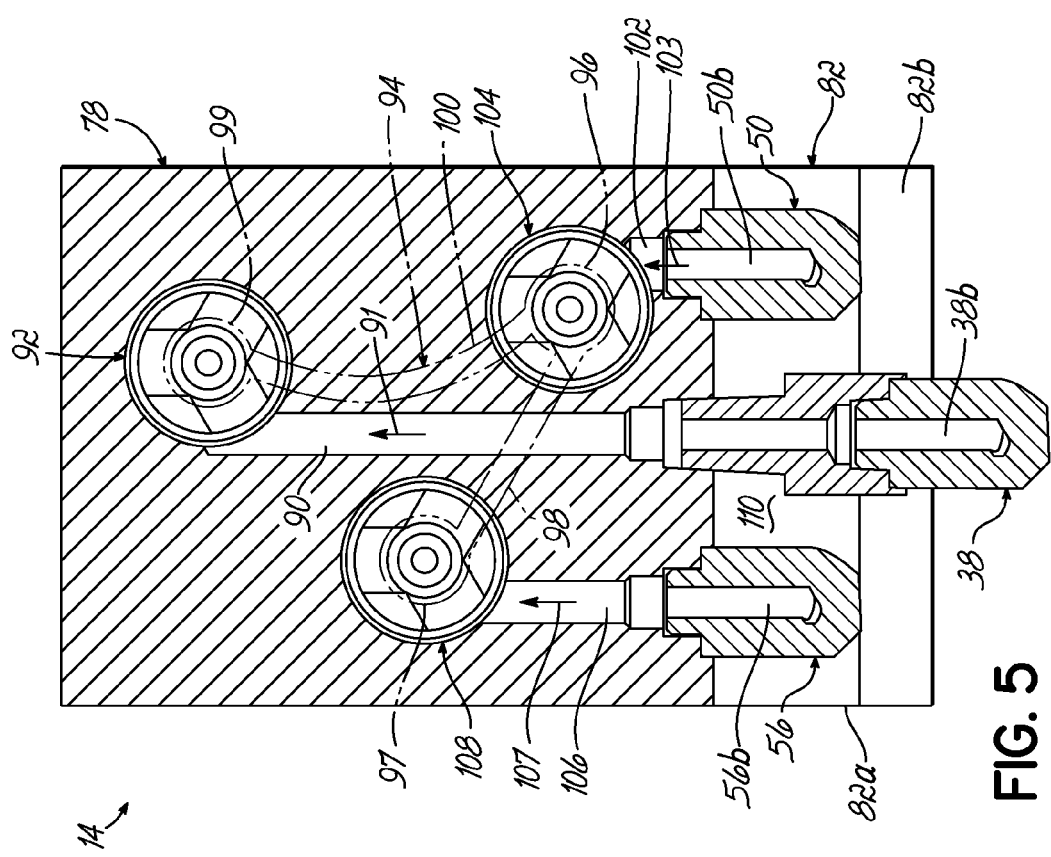
FIG. 5 is a top view in cross-section of the dispenser gun taken along line 5-5 of FIG. 4.

The gun body 78 includes the first gun body inlet 38, which includes a first inlet port 38a and a first inlet passage 38b for receiving and delivering component A into the gun body 78. The gun body 78 further includes a first inlet passage 90 extending from the first inlet passage 38b to a first valve 92 as illustrated in FIG. 5. Component A flows through the first inlet passage 90 to the first valve 92 as shown by arrow 91.

The first valve 92 is a pneumatically-operated spool valve in the illustrated embodiment. In this regard, the first solenoid valve 88a operates to open and close the first valve 92 as well understood in the art. When the first valve 92 is opened, component A flows from the first inlet passage 90 through the first valve 92 directly into a downstream segment 99 of a gun body fluid passage 94 (shown in phantom in FIG. 5) disposed below the first valve 92. The gun body fluid passage 94 is machined into a bottom surface 79 of the gun body 78 and further includes an upstream segment 97, an intermediate segment 96, a first intermediate passage 98 extending from the upstream segment 97 to the intermediate segment 96, and a second intermediate passage 100 extending from the intermediate segment 96 to the downstream segment 99. The gun body fluid passage 94 is described in further detail with respect to FIG. 6, below.

Returning to FIG. 5, the gun body 78 also includes the second gun body inlet 50, which includes a second inlet port 50a and a second inlet passage 50b for receiving and delivering component B into the gun body 78. The gun body 78 further includes a second inlet passage 102 extending from the second inlet passage 50b to a second valve 104. Component B flows through the second inlet passage 102 to the second valve 104 as shown by arrow 103. The second valve 104 is a pneumatically-operated spool valve in the illustrated embodiment. In this regard, the second solenoid valve 88b operates to open and close the second valve 104. When the second valve 104 is opened, component B flows from the second inlet passage 102 through the second valve 104 directly into the intermediate segment 96 of the gun body fluid passage 94 disposed adjacent to the bottom surface 79 of the gun body 78.

The gun body 78 further includes the third gun body inlet 56, which includes a third inlet port 56a and a third inlet passage 56b for receiving and delivering the flushing component into the gun body 78. The gun body 78 further includes a third inlet passage 106 extending from the third inlet passage 56b to a third valve 108. The flushing component flows through the third inlet passage 106 to the third valve 108 as shown by arrow 107. The third valve 108 is a pneumatically-operated spool valve in the illustrated embodiment. In this regard, the third solenoid valve 88c operates to open and close the third valve 108. When the third valve 108 is opened, the flushing component flows from the third inlet passage 106 through the third valve 108 directly into the upstream segment 97 of the gun body fluid passage 94 disposed adjacent to the bottom surface 79 of the gun body 78.

Figure 6:
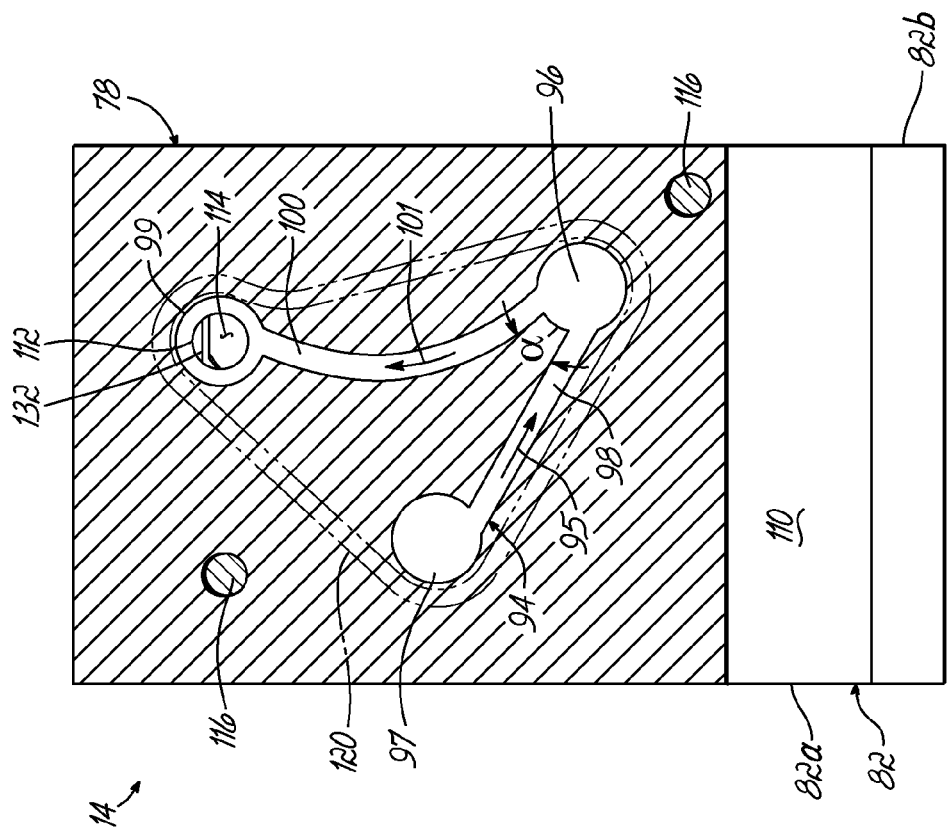
FIG. 6 is a top view in cross-section of the dispenser gun taken along line 6-6 of FIG. 4.

As shown in FIG. 6, the gun body fluid passage 94 is a non-linear passage in the form of a groove machined into the bottom surface 79 of the gun body 78. A "non-linear" passage is defined as a passage having first and second ends with a flow path between the first and second ends that is not straight, e.g., the flow path has angled bends and/or curved portions between the first and second ends. The groove defining the gun body fluid passage 94 opens downwardly away from the bottom surface 79 and extends in a non-linear manner from a first end of the gun body fluid passage 94 (i.e., at the upstream segment 97) to a second end of the gun body fluid passage 94 (i.e., at the downstream segment 99). More particularly, the first intermediate passage 98 extends in a generally straight or linear direction from the upstream segment 97 to the intermediate segment 96. The second intermediate passage 100 extends from the intermediate segment 96 to define a generally non-linear or curved flow path to the downstream segment 99. The first intermediate passage 98 and the second intermediate passage 100 both communicate with the same side of the intermediate segment 96 such that the first and second intermediate passages 98, 100 define an acute angle α between themselves at the intermediate segment 96. The combination of the curved flow path of the second intermediate passage 100 and the overall non-linear shape of the gun body fluid passage 94 inhibits flow of component A and component B in an upstream direction toward the upstream segment 97. In this regard, the flow through the first intermediate passage 98 is indicated by arrow 95 in FIG. 6, while the flow through the second intermediate passage 100 is indicated by arrow 101 in FIG. 6.

Maintaining the flow through the gun body fluid passage 94 in the directions indicated by arrows 95 and 101 with the non-linear shape of the gun body fluid passage 94 is advantageous because this flow discourages premature mixing of component A and component B, which may react with each other when mixed to produce the liquid encapsulation material for a solar panel 1. More particularly, component A is forced by the concurrent flow of component B to flow into the mixing manifold 82 instead of flowing in an "upstream" direction towards the intermediate segment 96 and the upstream segment 97. As such, less flushing component is required to clean the liquid dispenser gun 14 of mixed material during a flushing process because there will be less mixed material in the gun body flow passage 94. Furthermore, limiting the amount of mixed material in the gun body 78 downstream of the first, second, and third valves 92, 104, 108 tends to reduce undesirable dripping from the dispenser gun 14 caused by gravity between dispensing cycles.

Additionally, component B is delivered through the gun body fluid passage with a laminar flow. More specifically, component B travels with a laminar flow through the second intermediate passage 100 from the intermediate segment 96 to the downstream segment 99. By contrast, the flushing component is delivered through the gun body fluid passage in a manner that produces turbulence in the flushing component to improve the cleaning or flushing capability of the flushing component. To this end, the turbulence may be produced in the flushing component by forcing the flushing component to abruptly change direction within the gun body fluid passage, and more specifically, at the intermediate segment 96. The turbulence may be produced at the intermediate segment 96 by directing the flushing component around the acute angle α as defined by the first intermediate passage 98 and the second intermediate passage 100. The turbulence produced around the intermediate segment 96 is effective at flushing or cleaning out dead spaces that may appear in the flow through the gun body fluid passage 94 at the intermediate segment 96. It will be appreciated that the precise non-linear shape of the gun body fluid passage 94 and the locations of the first, second, and third valves 92, 104, 108 within the gun body 78 may be modified within the scope of this invention. However, the first, second, and third valves 92, 104, 108 remain disposed adjacent to the gun body fluid passage 94 and the bottom surface 79 of the gun body 78 in all embodiments.

As shown in FIGS. 6 and 7, the mixing manifold 82 includes an upper surface 110 configured to abut the bottom surface 79 of the gun body 78 and thereby form a bottom boundary of the gun body fluid passage 94 (which is machined into the bottom surface 79 as previously described). The mixing manifold 82 includes an upstream mixer passage port 112 disposed directly under the first valve 92 at the downstream segment 99 of the gun body fluid passage 94. The upstream mixer passage port 112 provides fluid communication between the downstream segment 99 and a mixer passage 114 (shown in phantom in FIG. 7) within the mixing manifold 82. Consequently, component A and component B do not encounter each other in the gun body 78 until right before the two components enter the mixing manifold 82 through the upstream mixer passage port 112. This arrangement minimizes the volume of the two components within the gun body 78 downstream of the respective first and second valves 92, 104. As a result, the pressure head formed by the volume of the two components held within the dispenser gun 14 between the first and second valves 92, 104 and a plurality of fluid outlets 160 at the nozzle plate 84 (described in detail below) is minimized and reduces the likelihood of undesirable dripping of the two-component mixture from the dispenser gun 14 between dispensing cycles. Furthermore, the dispenser gun 14 also minimizes the amount of wasted material flushed from the dispenser gun 14 when the flushing component is delivered into the dispenser gun 14 at the upstream segment 97 of the gun body fluid passage 94.

The mixing manifold 82 is more clearly illustrated in FIGS. 7 and 8. The mixing manifold 82 is coupled to the gun body 78 by a plurality of generally vertical coupling bolts 116 extending from the nozzle plate 84 through the mixing manifold 82 and into the gun body 78. It will be understood that more or fewer coupling bolts 116 or other conventional fasteners may be provided in the same or different locations in other embodiments. The upper surface 110 of the mixing manifold 82 further includes a loop-shaped groove 118 generally surrounding the gun body fluid passage 94. A seal member 120 such as an elastomeric seal is positioned in the loop-shaped groove 118 to seal the gun body fluid passage 94 from the exterior of the dispenser gun 14.

The mixing manifold 82 includes a mixing manifold main body 82a, a first cap 82b along a front sidewall 122 of the mixing manifold main body 82a, and a second cap 82c along a rear sidewall 124 of the mixing manifold main body 82a. The mixer passage 114 is disposed within the mixing manifold main body 82a and includes an upstream mixer passage end 126 that receives liquid flowing through the upstream mixer passage port 112 from the gun body fluid passage 94. The mixer passage 114 also includes a downstream mixer passage end 128 in fluid communication with a downstream mixer passage port 130 leading to the nozzle plate 84, as described in further detail below.

The mixer passage 114 is shaped as a convoluted flow passage including a first mixer passage portion 114a, a second mixer passage portion 114b, and a third mixer passage portion 114c each extending generally parallel to one another from the front sidewall 122 of the mixing manifold main body 82a to the rear sidewall 124 of the mixing manifold main body 82a. It will be understood that the term "convoluted" in this description refers to a passage following a back-and-forth or tortuous path. The mixer passage 114 is formed by drilling three elongate through-bores from the front sidewall 122 to the rear sidewall 124 such that a first intermediate manifold wall 123 divides the first and second mixer passage portions 114a, 114b and a second intermediate manifold wall 125 divides the second and third mixer passage portions 114b, 114c. The first and second mixer passage portions 114a, 114b are then fluidly connected by milling the first intermediate manifold wall 123 inwardly from the front sidewall 122 to form a first intermediate manifold wall free end 123a spaced inwardly from the front sidewall 122. In a similar manner, the second and third mixer passage portions 114b, 114c are fluidly connected by milling the second intermediate manifold wall 125 inwardly from the rear sidewall 124 to form a second intermediate manifold wall free end 125a spaced inwardly from the rear sidewall 124.

In operation, the liquid flowing in the mixer passage 114 flows into the first mixer passage portion 114a at the upstream mixer passage end 126 and travels toward the front sidewall 122 and then around the first intermediate manifold wall free end 123a into the second mixer passage portion 114b (as shown by arrow 127 in FIG. 8). In the second mixer passage portion 114b, the liquid flows toward the rear sidewall 124 and then around the second intermediate manifold wall free end 125a into the third mixer passage portion 114c (as shown by arrow 129 in FIG. 8). In the third mixer passage portion 114c, the liquid flows back toward the front sidewall 122 until reaching the downstream mixer passage end 128 and the downstream mixer passage port 130.

The mixing manifold 82 includes a plurality of mixing elements 132 such as mixing baffles in the mixer passage 114 for thoroughly mixing component A and component B to form the two-component mixture. The mixing elements 132 may be conventional helical-shaped mixing elements formed in first, second, and third baffle stacks 132a, 132b, 132c (i.e., static mixers) having sidewalls (as shown in FIG. 8) and inserted into the respective first mixer passage portion 114a, the second mixer passage portion 114b, and the third mixer passage portion 114c of the mixer passage 114. In this regard, the first, second, and third baffles stacks 132a, 132b, 132c are disposed generally parallel to each other in a side-by-side relationship. Each of the baffle stacks 132a, 132b, 132c is disposed along a corresponding static mixer axis 133a, 133b, 133c as shown in FIG. 8. The static mixer axes 133a, 133b, 133c are oriented orthogonally or transversely to a dispensing axis 160a (shown in FIG. 4) defined through any of the liquid outlets 160 discussed in further detail below. More particularly, the static mixer axes 133a, 133b, 133c are generally perpendicular to each of the dispensing axes 160a. In the illustrated embodiment, there are thirty-six total mixing elements 132 in the mixer passage 114. It will be appreciated that more or fewer mixing elements 132 of helical configuration or any other conventional design may be used in alternative embodiments of the dispenser gun 14.

As described above, each of the mixer passage portions 114a, 114b, 114c extends all the way to the front sidewall 122 and also the rear sidewall 124 of the mixing manifold main body 82a, thereby defining a plurality of access openings 134 through which the baffle stacks 132a, 132b, 132c may be slid into and out of the respective mixer passage portions 114a, 114b, 114c. The mixer passage portions 114a, 114b, 114c further define respective first, second, and third mixer passage axes 135a, 135b, 135c which are substantially parallel to the corresponding static mixer axes 133a, 133b, 133c of the baffle stacks 132a, 132b, 132c. In the illustrated embodiment, the first static mixer axis 133a is collinear with the first mixer passage axis 135a, the second static mixer axis 133b is collinear with the second mixer passage axis 135b, and the third static mixer axis 133c is collinear with the third mixer passage axis 135c. Furthermore, the static mixer axes 133a, 133b, 133c and the mixer passage axes 135a, 135b, 135c are generally defined along the direction of fluid flow through the corresponding mixer passage portions 114a, 114b, 114c. Consequently, the baffle stacks 132a, 132b, 132c may be moved by pushing or pulling the baffle stacks 132a, 132b, 132c through the access openings 134 and more particularly, along the direction defined by the respective static mixer axes 133a, 133b, 133c and the respective mixer passage axes 135a, 135b, 135c.

The first cap 82b is removably coupled to the front sidewall 122 of the mixing manifold main body 82a with a pair of bolts 136 or similar fasteners. The first cap 82b covers the access openings 134 along the front sidewall 122 and includes a seal member 138 for sealing the access openings 134 and mixer passage 114 from outside the dispenser gun 14. In a similar manner, the second cap 82c is removably coupled to the rear sidewall 124 of the mixing manifold main body 82a with another pair of bolts 136 or similar fasteners. The second cap 82c covers the access openings 134 along the rear sidewall 124 and includes a seal member 140 for sealing the access openings 134 and mixer passage 114 from outside the dispenser gun 14. Thus, the first and second caps 82b, 82c enable ready access to the mixer passage 114 and the mixing elements 132 for servicing the mixing elements 132 without disassembling the entire dispenser gun 14.

Figure 9:
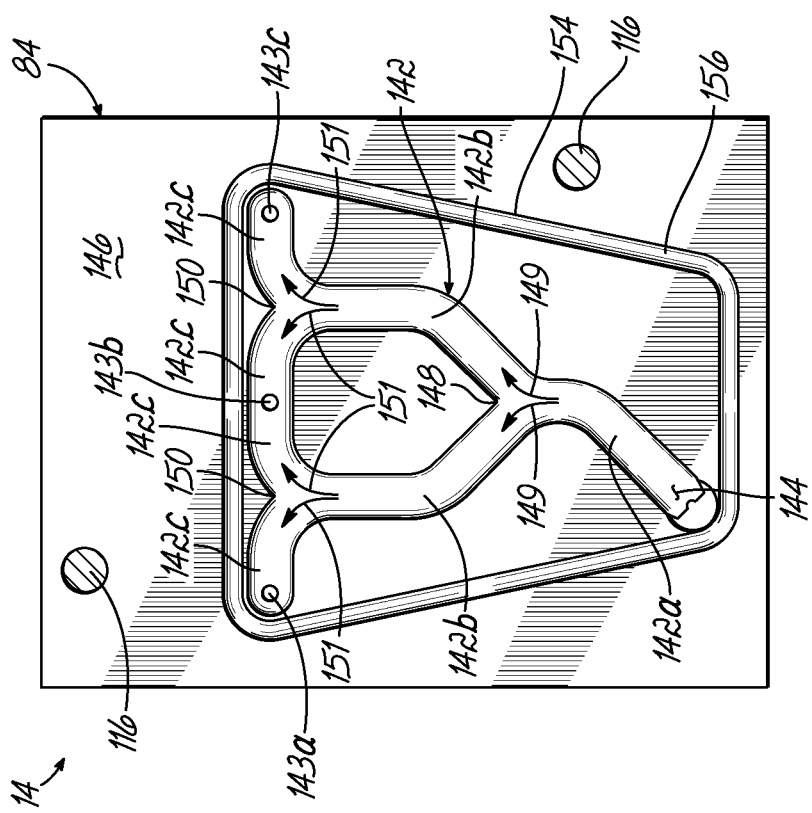
FIG. 9 is a top view in cross-section of the dispenser gun taken along line 9-9 of FIG. 4.

After component A and component B have been thoroughly mixed together by the mixing elements 132, the resulting two-component mixture flows from the downstream mixer passage end 128 through the downstream mixer passage port 130 into an upstream end 144 of a nozzle passage 142 in the nozzle plate 84, as shown in FIG. 9. The nozzle passage 142 is formed along an upper surface 146 of the nozzle plate 84 and is bounded on an upper side by a bottom surface 83 of the mixer manifold 82. The nozzle passage 142 is a smooth-contoured passage in the form of a groove machined into the upper surface 146 of the nozzle plate 84.

The nozzle passage 142 includes a first nozzle passage portion 142a which divides into a pair of second nozzle passage portions 142b at a generally Y-shaped junction 148 (as shown by arrows 149). Each of the second nozzle passage portions 142b then divides again into a plurality of third nozzle passage portions 142c at generally T-shaped junctions 150 (as shown by arrows 151). It will be appreciated that the Y-shaped junction 148 and T-shaped junctions 150 have smooth curved contours to encourage even and continuous flow throughout the nozzle passage 142. The third nozzle passage portions 142c extend generally in series across a portion of the width of the nozzle plate 84 and collectively lead to a plurality of generally vertical downstream end passages 143a, 143b, 143c. Each of the downstream end passages 143a, 143b, 143c extends to one respective nozzle 152a, 152b, 152c (shown in FIG. 10) removably clamped to the nozzle plate 84. Thus, the two-component mixture flows from the upstream end 144 of the nozzle passage 142 through the nozzle passage portions 142a, 142b, 142c, and through the downstream end passages 143a, 143b, 143c to the nozzles 152a, 152b, 152c.

The nozzle plate 84 further includes a loop-shaped groove 154 at the upper surface 146 surrounding the nozzle passage portions 142a, 142b, 142c. A seal member 156 such as an elastomeric seal is positioned in the loop-shaped groove 154 between the nozzle plate 84 and the mixing manifold 82 to thereby seal the nozzle passage 142 from outside the dispenser gun 14. The smooth contours of the nozzle passage 142 and the division and subdivision of liquid flow at the Y-shaped junction 148 and T-shaped junctions 150 promotes even and continuous flow across the width of the nozzle plate 84 at the third nozzle passage portions 142c. As a result, the amount of two-component mixture delivered to each nozzle 152a, 152b, 152c through the respective downstream end passages 143a, 143b, 143c is roughly equivalent, thereby ensuring that the flow consistency across the width of the dispenser gun 14 is maintained. As a result, the dispensed two-component mixture forms a more continuous encapsulation layer on the substrate 12. It will be understood that the downstream end passages 143a, 143b, 143c could each supply two or more nozzles clamped to the nozzle plate 84 in alternative embodiments of the invention.

Figure 10:
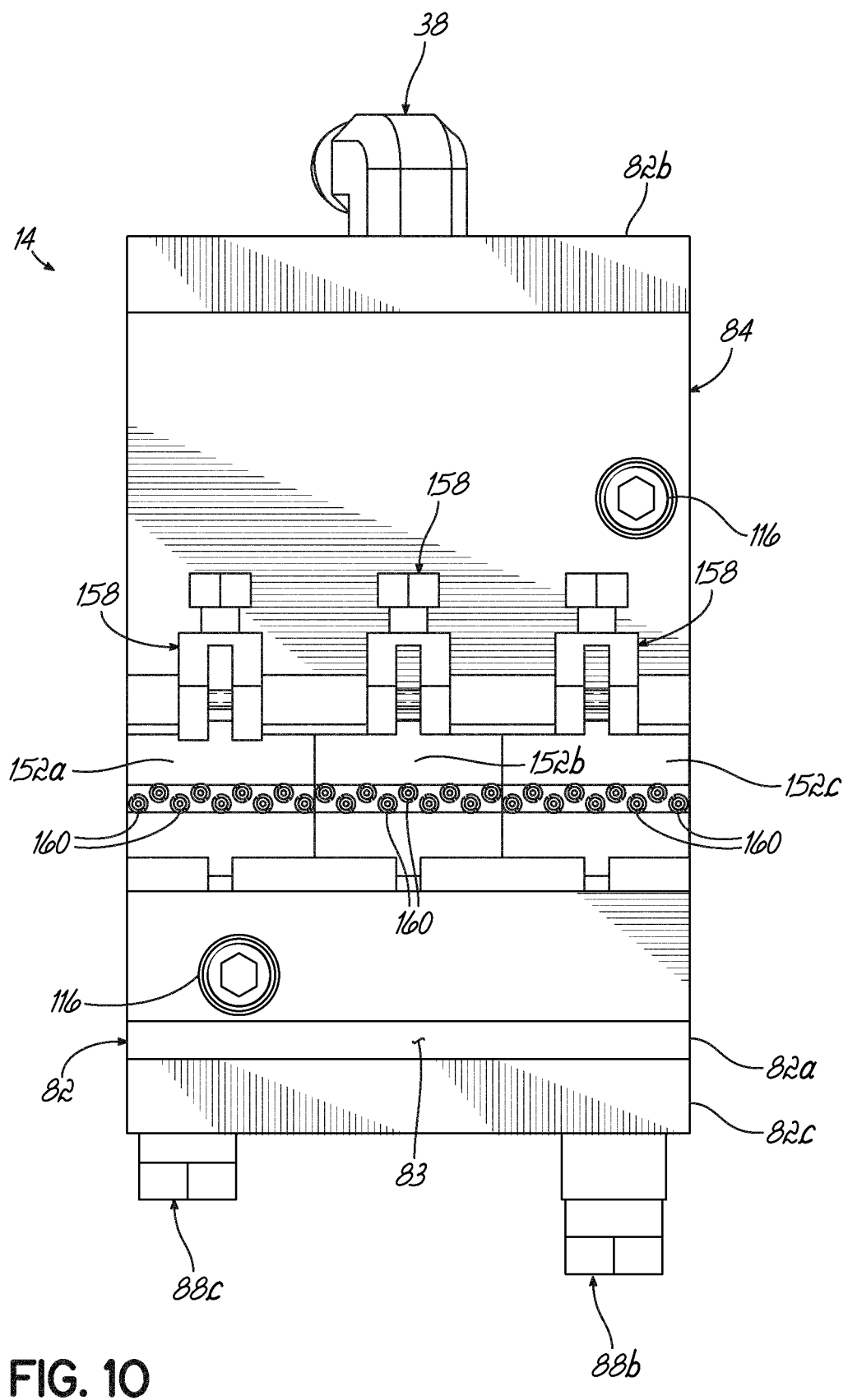
FIG. 10 is a bottom view of the dispenser gun of FIG. 4.

In the illustrated embodiment shown most clearly at FIG. 10, the nozzle plate 84 is coupled to three nozzles 152a, 152b, 152c, also referred to as nozzle dies 152 across a width of the dispenser gun 14. The nozzles 152 are removably clamped onto the nozzle plate 84 with associated clamping mechanisms 158 corresponding to the clamping mechanisms disclosed in U.S. Pat. No. 6,619,566, which is hereby incorporated by reference in its entirety. One or more of the nozzles 152 may be removed or coupled to the nozzle plate 84 to modify the overall width of two-component mixture dispensed by the dispenser gun 14 onto the substrate 12. When a nozzle 152 is removed from the nozzle plate 84, a nozzle blank (not shown) must be clamped in place of the nozzle 152 to block liquid flow from the corresponding downstream end passage 143.

Each of the nozzles 152 includes a plurality of liquid outlets 160 in fluid communication with at least one of the downstream end passages 142d. As described above, each of the liquid outlets 160 is disposed along a respective dispensing axis 160a that is generally orthogonal or transverse to the static mixer axes 133a, 133b, 133c. The plurality of liquid outlets 160 are staggered in a sawtooth-like pattern on each nozzle 152 so that adjacent streams of dispensed two-component mixture may be dispensed close together in a widthwise direction of the dispenser gun 14. The staggered pattern of the liquid outlets 160 inhibits undesirable combining of dispensed liquid streams prior to application of the liquid streams on the substrate 12, which can lead to discontinuities in the encapsulation layer formed by the two-component mixture. In this regard, the liquid outlets 160 are arranged to ensure a substantially continuous encapsulation layer, which is desirable for lamination of a solar cell substrate 12. It will be understood that the plurality of liquid outlets 160 could alternatively be formed in different alignments (i.e., in series) in other embodiments.

Figure 11:
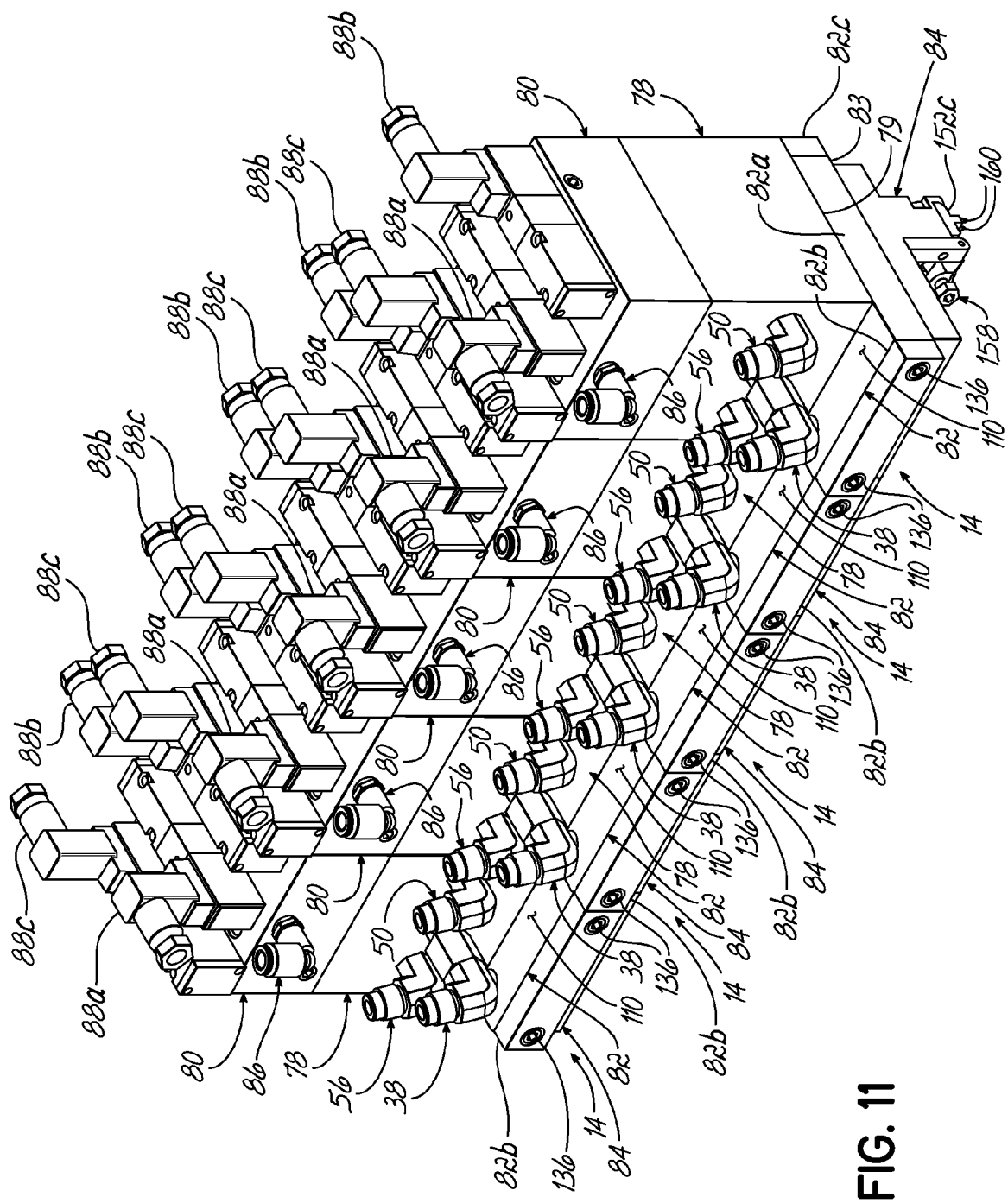
FIG. 11 is a perspective view of a plurality of dispenser guns of FIG. 4 coupled together in another embodiment of the liquid dispenser system.

To further increase the modularity and adaptability of the liquid dispenser system 10, the system 10 may include a plurality of dispenser guns 14 coupled together in series as shown in the embodiment illustrated at FIG. 11. Each of the dispenser guns 14 includes the same structure and elements described in detail with respect to the first embodiment of FIGS. 4-10. Thus, the dispenser system 10 may include any number of nozzles 152 (e.g., up to fifteen) clamped to the dispenser guns 14. Assuming for the sake of illustration that each nozzle 152 is 25 millimeters in width, the dispenser system 10 of FIG. 11 could readily dispense the two-component mixture of encapsulation material onto solar cell substrates 12 ranging in width from about 25 millimeters to about 375 millimeters. It will be understood that the dispenser guns 14 may be modified to couple to more than three nozzles 152, such that the dispensing width may be further modified.

If the first and second flow meters 16, 18 used for the dispenser system 10 are flow shot meters 58 as described above with reference to FIG. 3, these flow shot meters 58 are configured to meter an accurate supply of component A or component B for a total dispensed width of up to 250 millimeters. Therefore, the dispenser system 10 of FIG. 11 would require two or more of each first and second flow meter 16, 18 respectively operatively coupled to at least two of the dispenser guns 14. To this end, multiple supply pumps 20, 22, 24 may also be provided in the dispenser system 10 to ensure adequate flow of each component to the dispenser guns 14. It will be understood that any number of supply pumps, flow meters, and dispenser guns may be utilized with the dispenser system 10 in alternative embodiments. As such, the dispenser system 10 is completely modular and enables nearly unlimited modification of a width of the dispensed two-component mixture, depending upon the specific application.

In summary, the liquid dispenser system 10 of the invention is adapted to mix a two-component mixture and dispense a plurality of streams that congeal into a substantially continuous layer on a substrate 12, the layer having almost any width.

Supply pumps 20, 22, 24 deliver a supply of component A, component B, and the flushing component to the dispenser gun 14. First and second flow meters 16, 18 control the supply of component A and component B to the dispenser gun 14 such that the two-component mixture may be formed with a specific mixing ratio. Component A and component B do not encounter one another in the gun body 78 until the downstream segment 99 of a non-linear gun body fluid passage 94, immediately before the components enter the mixing manifold 82. This configuration of the gun body 78 minimizes the amount of the components held in the dispenser gun 14 between the valves 92, 104 and the flow outlets 160, thereby discouraging undesirable dripping from the flow outlets 160 between dispensing cycles and reducing the amount of wasted material during a flushing operation. The non-linear shape of the gun body fluid passage 94 also inhibits flow of component A and component B toward the upstream segment 97 of the gun body fluid passage 94. Furthermore, the second component is delivered through the gun body fluid passage 94 at the second intermediate passage 100 with a laminar flow, while the flushing component is delivered through the gun body fluid passage 94 from the upstream segment 97 to the downstream segment 99 in a manner that produces turbulence in the flushing component, to thereby more thoroughly clean or flush out the dispenser gun 14.

The mixing elements 132 in the mixing manifold 82 thoroughly mix component A and component B to form the two-component mixture, which is then evenly distributed across the width of the nozzle plate 84 by the nozzle passage 142. The two-component mixture is then dispensed through a plurality of flow outlets 160 in the corresponding nozzles 152. The flow outlets 160 are staggered in a sawtooth-like configuration to ensure that the separate streams of the two-component mixture congeal or flow together to form a continuous encapsulation layer only after being deposited on the substrate 12. The dispenser gun 14 may be flushed after a dispensing cycle by delivering flushing component through the third valve 108, the gun body fluid passage 94, the mixer passage 114, and the nozzle passage 142. Furthermore, the completely modular nature of the dispenser guns 14 and the nozzles 152 increases overall efficiency by reducing the amount of time and effort required to reconfigure the dispenser system 10 for differently-sized substrates 12.

While the present invention has been illustrated by a description of preferred embodiments and while these embodiments have been described in some detail, it is not the intention of the Applicant to restrict or in any way limit the scope of the appended claims to such detail. Additional advantages and modifications will readily appear to those skilled in the art. For example, the overall width of the dispenser gun 14 may be increased to 250 millimeters wide with ten or more nozzles 152 clamped to the dispenser gun 14 in another embodiment of the dispenser system 10. The various features of the invention may be used alone or in numerous combinations depending on the needs and preferences of the user.

What is claimed is:

1. A liquid dispenser gun adapted to mix first and second liquid components of a two-component mixture and dispense the two-component mixture on a substrate, the liquid dispenser gun comprising:
    a gun body including a first gun body inlet adapted to receive the first component, a second gun body inlet adapted to receive the second component, and a third gun body inlet adapted to receive a liquid flushing component, the gun body further including a gun body fluid passage in fluid communication with the first gun body inlet, the second gun body inlet, and the third gun body inlet, wherein the gun body fluid passage is a non-linear passage including a downstream segment and an upstream segment such that the first component is introduced into the gun body fluid passage at the downstream segment, the second component is introduced into the gun body fluid passage between the downstream segment and the upstream segment with a laminar flow through the gun body fluid passage toward the downstream segment, and the flushing component is introduced into the gun body fluid passage at the upstream segment and at an angle to the laminar flow of the second component to thereby produce turbulence in the flushing component as the flushing component flows toward the downstream segment;
    a mixing manifold coupled to the gun body and including a mixer passage in fluid communication with the gun body fluid passage and a plurality of mixing elements disposed in the mixer passage; and
    a nozzle plate coupled to the mixing manifold and including at least one nozzle with a plurality of liquid outlets, the nozzle plate providing fluid communication between the mixer passage and the at least one nozzle.

2. The liquid dispenser gun of claim 1, wherein the gun body further includes a bottom surface coupled to the mixing manifold, and the gun body fluid passage is formed by a groove in the bottom surface of the gun body.

3. The liquid dispenser gun of claim 2, wherein the downstream segment of the gun body fluid passage is in direct fluid communication with the first gun body inlet and the mixer passage, the upstream segment of the gun body fluid passage is in direct fluid communication with the third gun body inlet, and the gun body fluid passage further includes:
    an intermediate segment disposed between the upstream and downstream segments and in direct fluid communication with the second gun body inlet.

4. The liquid dispenser gun of claim 3, wherein the gun body fluid passage further includes:
    a first intermediate passage extending between the upstream segment and the intermediate segment, and
    a second intermediate passage extending between the intermediate segment and the downstream segment,
    wherein the first and second intermediate passages define an acute angle between the first and second intermediate passages at the intermediate segment such that the flushing component introduced to the gun body fluid passage abruptly changes direction by flowing around the acute angle at the intermediate segment.

5. The liquid dispenser gun of claim 3, wherein the gun body further includes:
    a first valve adjacent to the downstream segment and configured to control flow of the first component from the first gun body inlet to the gun body fluid passage,
    a second valve adjacent to the intermediate segment and configured to control flow of the second component from the second gun body inlet to the gun body fluid passage, and
    a third valve adjacent to the upstream segment and configured to control flow of the flushing component from the third gun body inlet to the gun body fluid passage.

6. The liquid dispenser gun of claim 1, wherein the at least one nozzle includes a plurality of nozzles which are removable from the nozzle plate to modify a width of the dispensed two-component mixture.

7. The liquid dispenser gun of claim 1, wherein the plurality of liquid outlets are arranged in a staggered formation across a width of the gun.

8. The liquid dispenser gun of claim 1, wherein the mixing manifold further includes a mixing manifold main body including the mixer passage and at least one access opening for access to the plurality of mixing elements, wherein the mixer passage defines a mixer passage axis along the direction of fluid flow through the mixer passage and the plurality of mixing elements defines a static mixer axis substantially parallel to the mixer passage axis, and the mixing manifold also includes at least one cap removably coupled to the mixing manifold main body and configured to be removed from the mixing manifold main body to permit insertion or removal of the plurality of mixing elements along the static mixer axis and the mixer passage axis.

9. The liquid dispenser gun of claim 1, wherein the mixer passage defines a mixer passage axis along a direction of flow of the two-component mixture, and each liquid outlet defines a dispensing axis transverse to the mixer passage axis.

10. A liquid dispenser system comprising:
the liquid dispenser gun as recited in claim 1;
at least one supply pump for delivering one or more of the first liquid component, the second liquid component, and the liquid flushing component to the gun body;
a first flow meter configured to meter the flow of first component delivered to the gun body; and
a second flow meter configured to meter the flow of second component delivered to the gun body.

11. The liquid dispenser system of claim 10, further comprising at least two liquid dispenser guns as recited in claim 1 and coupled to each another to modify a width of the dispensed two-component mixture.

12. The liquid dispenser system of claim 10, wherein the first flow meter and the second flow meter are selected from the group consisting of a continuous flow shot meter, a rotary piston pump, and a gear pump.

13. A method of mixing first and second liquid components of a two-component mixture and dispensing the two-component mixture on a substrate with the dispenser gun of claim 1, the method comprising:
delivering the first component via the first gun body inlet into the downstream segment of the gun body fluid passage;
delivering the second component via the second gun body inlet into the gun body fluid passage between the downstream segment and the upstream segment with a laminar flow through the gun body fluid passage toward the downstream segment;
mixing the first component and the second component with the plurality of mixing elements to form the two-component mixture;
dispensing streams of the two-component mixture from the plurality of liquid outlets onto the substrate; and
delivering a flushing component via the third gun body inlet into the upstream segment at an angle to the laminar flow of the second component and through the gun body fluid passage in a manner that produces turbulence in the flushing component upstream of the downstream segment to clean the dispenser gun of the first component, the second component, and the two-component mixture.

14. The method of claim 13, wherein the turbulence is produced in the flushing component by forcing the flushing component to abruptly change direction within the gun body fluid passage.

15. The method of claim 14, wherein the turbulence is produced in the flushing component by directing the fluid around an angle of less than 90 degrees defined by the gun body fluid passage.

16. The method of claim 15, wherein the gun body fluid passage includes a first intermediate passage and a second intermediate passage joined by an intermediate segment, and wherein the first and second intermediate passages define the angle of less than 90 degrees between each other such that the turbulence produced in the flushing component cleans out any dead space in the intermediate segment.

17. The method of claim 13, wherein the gun body fluid passage further includes an intermediate segment disposed between the upstream and downstream segments, and the laminar flow of the second component is produced from the intermediate segment to the downstream segment.

18. The method of claim 13, wherein the flushing component is introduced to the gun body fluid passage at an angle of less than 90 degrees from the laminar flow of the second component to produce the turbulence in the flushing component.

19. The method of claim 13, wherein the gun body includes a bottom surface and the gun body fluid passage is at least partially defined by a groove in the bottom surface, and the method further comprises:
inhibiting movement of the combined flows of the first component and the second component from the downstream segment towards the upstream segment of the gun body fluid passage.

20. The method of claim 13, wherein the plurality of liquid outlets are arranged in a staggered formation across a width of the dispenser gun, the staggered formation ensuring that the dispensed streams of the two-component mixture are staggered to prevent flowing together of adjacent dispensed streams prior to application on the substrate.

21. The method of claim 13, wherein the substrate is one of a solar cell or a first covering panel, the first component is a base component of a liquid encapsulation material for a solar panel, and the second component is a catalyst component of the liquid encapsulation material, and the method further comprises:
adhesively coupling the first covering panel to a first side of the solar cell with the substantially continuous layer of the two-component mixture.

22. The method of claim 21, further comprising:
dispensing streams of the two-component mixture from the plurality of liquid outlets onto at least one of a second side of the solar cell or a second covering panel, such that adjacent streams of the two-component mixture flow together to form a second substantially continuous layer; and
adhesively coupling the second covering panel to the second side of the solar cell with the second substantially continuous layer of the two-component mixture, to thereby form a solar cell sandwich including the solar cell and the first and second covering panels.

23. The method of claim 22, further comprising:
curing the two-component mixture in the solar cell sandwich by passing the solar cell sandwich through a laminator.

24. The method of claim 23, further comprising:
installing a frame member around the solar cell sandwich; and
installing a junction box on the second glass panel, the junction box operative to deliver energy from the solar cell to another device,
wherein the solar cell sandwich, the frame member, and the junction box collectively define an assembled solar panel configured to generate energy.

25. A liquid dispenser gun adapted to mix first and second liquid components of a two-component mixture and dispense the two-component mixture on a substrate, the liquid dispenser gun comprising:
- a gun body including a first gun body inlet adapted to receive the first component, a second gun body inlet adapted to receive the second component, and a third gun body inlet adapted to receive a liquid flushing component, the gun body further including a bottom surface and a gun body fluid passage in fluid communication with the first gun body inlet, the second gun body inlet, and the third gun body inlet;
- a mixing manifold coupled to the gun body and including a mixer passage in fluid communication with the gun body fluid passage and at least one static mixer disposed in the mixer passage along a static mixer axis, wherein the first and second component flowing through the at least one static mixer follows a flow path along the static mixer axis; and
- a nozzle plate coupled to the mixing manifold and including an upper surface and at least one nozzle with a plurality of liquid outlets, the nozzle plate providing fluid communication between the mixer passage and the at least one nozzle, each of the upper surface of the nozzle plate and the bottom surface of the gun body located in face-to-face surface contact with the mixing manifold,
- wherein each of the plurality of liquid outlets defines a respective dispensing axis transverse to the static mixer axis.

26. The liquid dispenser gun of claim 25, wherein each dispensing axis is perpendicular to the static mixer axis.

27. The liquid dispenser gun of claim 25, wherein the mixer passage in the mixing manifold includes a plurality of mixer passage portions, each configured to receive a static mixer, and each of the mixer passage portions defines a static mixer axis which is transverse to each of the dispensing axes of the liquid outlets in the nozzle plate.

28. The liquid dispenser gun of claim 1, wherein the gun body fluid passage defines only a single flow path from a first terminal end at the upstream segment to a second terminal end at the downstream segment so as to limit a retained volume within the gun body fluid passage.

29. The liquid dispenser gun of claim 1, wherein the gun body fluid passage includes an intermediate segment disposed between the upstream and downstream segments, the intermediate segment being in direct fluid communication with the second gun body inlet, and wherein the intermediate and downstream segments are connected in fluid communication by a non-linear intermediate passage so as to discourage flow of the first component backwards in the gun body fluid passage from the downstream segment towards the intermediate segment.

* * * * *